(12) United States Patent
Whittenberger

(10) Patent No.: US 7,077,999 B2
(45) Date of Patent: Jul. 18, 2006

(54) MONOLITH FOR IMPARTING SWIRL TO A GAS STREAM

(75) Inventor: William A. Whittenberger, Leavittsburg, OH (US)

(73) Assignee: Catacel Corp., Leavittsburg, OH (US)

( * ) Notice: Subject to any disclaimer, the term of this patent is extended or adjusted under 35 U.S.C. 154(b) by 693 days.

(21) Appl. No.: 10/154,349

(22) Filed: May 23, 2002

(65) Prior Publication Data

US 2003/0219362 A1    Nov. 27, 2003

(51) Int. Cl.
*B01J 35/04* (2006.01)
*B01J 8/00* (2006.01)

(52) U.S. Cl. .................. 422/180; 422/177; 422/222
(58) Field of Classification Search ............... 422/177, 422/180, 190, 211, 222; 431/7, 9, 326
See application file for complete search history.

(56) References Cited

U.S. PATENT DOCUMENTS 5,820,835 A    10/1998    Sheller et al. ............... 422/180
5,846,495 A *  12/1998    Whittenberger et al. .... 422/180

* cited by examiner

*Primary Examiner*—Hien Tran
(74) *Attorney, Agent, or Firm*—William H. Eilberg

(57) ABSTRACT

A monolith for imparting swirl to a gas stream includes a stack of alternating flat and corrugated strips defining channels for gas flow. The strips are attached, at an angle, to a carrier. Also, the corrugations of the corrugated strips may be skewed. The carrier defines a cylindrical shell for the strips, and the strips extend from the carrier to a central region. The strips are curved, typically having substantially the shape of involutes, and substantially fill the space between the central region and the shell. Due to the angle of attachment between the strips and the carrier, the gas flow channels are oriented in different directions, at different locations on the outlet face of the monolith. This structure therefore imparts swirl to gas flowing through the monolith.

24 Claims, 19 Drawing Sheets

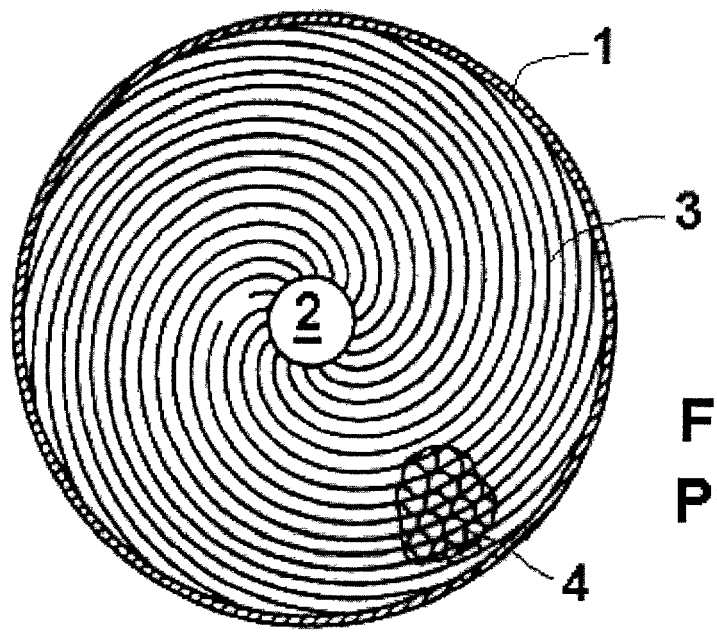
**Figure 1
Prior Art**
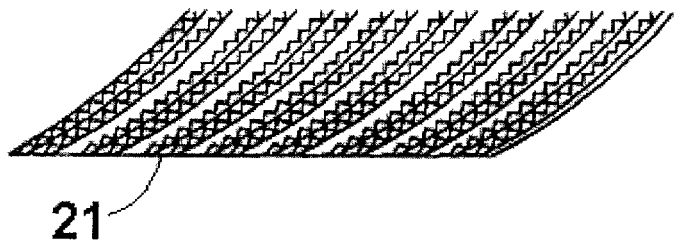
**Figure 2a
Prior Art**
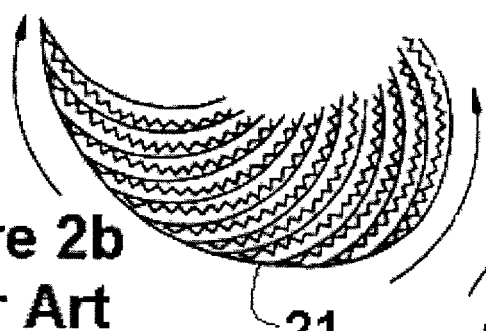
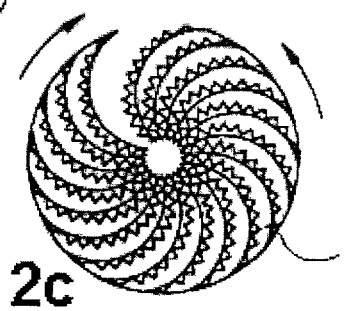
**Figure 2b
Prior Art**
**Figure 2c
Prior Art**

$\alpha = 38$ deg.

$\beta = 20$ deg.

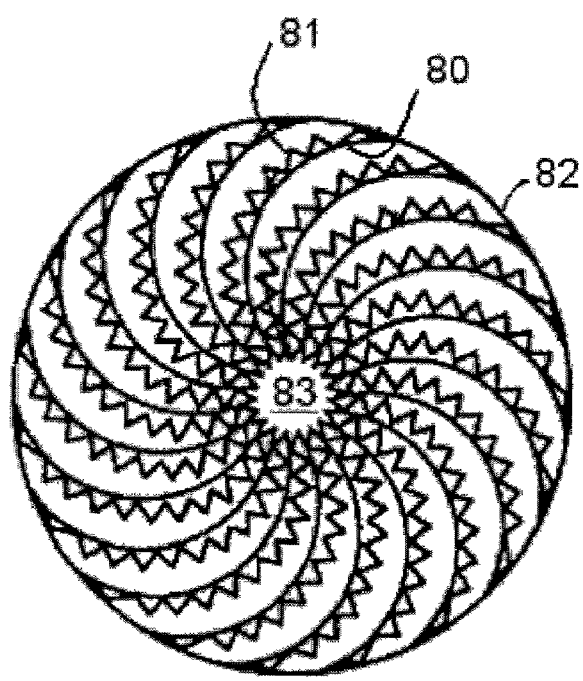 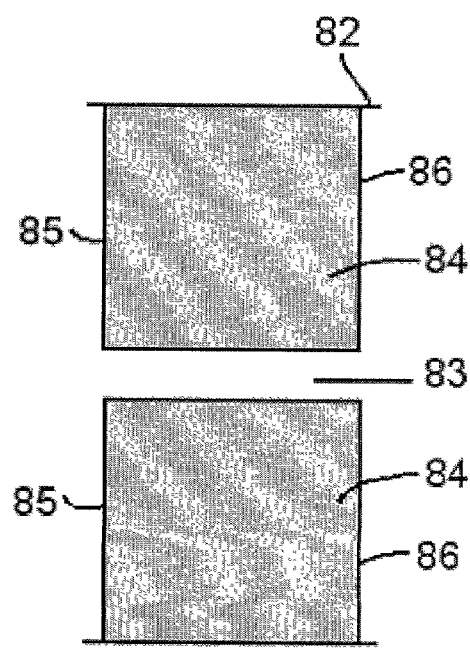
Figure 8d
Prior Art
Figure 8e
Prior Art

Gas Direction, left to right, and
A. Into the paper
B. Down
C. Out of the paper
D. Up

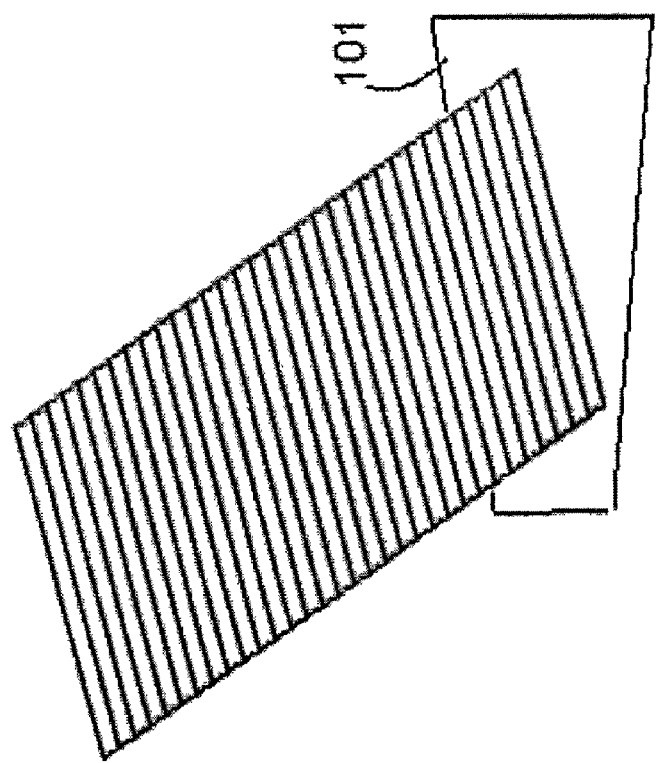
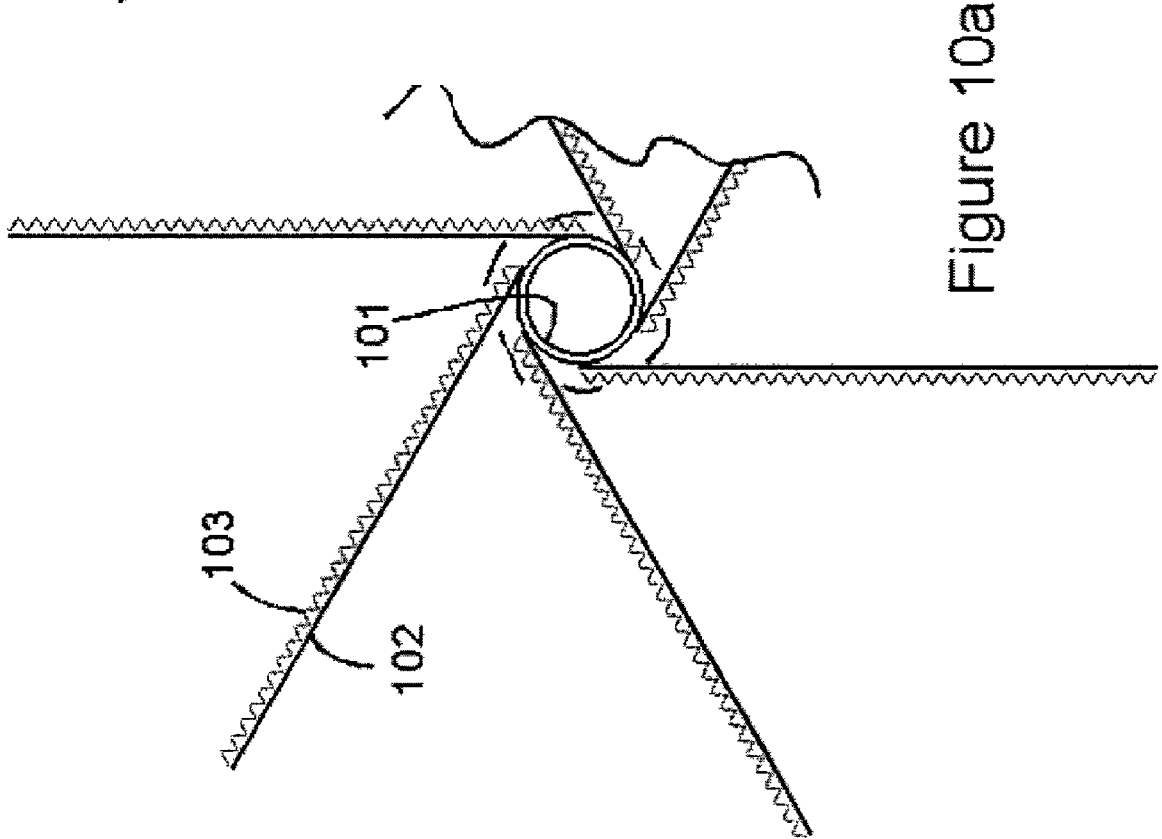
Figure 10b
Figure 10a

MONOLITH FOR IMPARTING SWIRL TO A GAS STREAM

BACKGROUND OF THE INVENTION

The present invention relates to the field of combustion, and provides a monolith which imparts swirl to a gas stream. The monolith of the present invention may itself comprise a catalytic combustor, but it could also be uncoated and used only for imparting swirl. Because of its structure, the monolith of the present invention is also called a honeycomb.

Imparting a swirl to a gas stream is useful in stabilizing any flame which is downstream of the catalytic elements in a gas turbine combustion system, or other combustion system. A swirl also helps to prevent flashback.

The monolith of the present invention is made from a plurality of alternating flat and corrugated metal strips, the strips being arranged in curved paths extending from an inner, central region to an outer cylindrical shell. The strips preferably have the shape of segments of curves which are substantially involutes, and therefore occupy substantially all of the cross-sectional area between the central region and the outer shell. Monoliths of this type are described in U.S. Pat. No. 5,820,835, the disclosure of which is hereby incorporated by reference.

The present invention provides a monolith which is formed of curved metal strips as described above, and which also imparts swirl to the gas flowing through it.

SUMMARY OF THE INVENTION

The present invention comprises a monolith for imparting swirl to a gas stream. The monolith may include a catalyst coating, or it may be uncoated.

The monolith comprises a plurality of alternating flat and corrugated sheet metal strips which define channels for gas flow. The corrugations of the corrugated strips may have a skew angle. The corrugated and flat strips are attached, at one end, to a sheet metal carrier, with a predetermined angle of attachment. The corrugated and flat strips are arranged in a curved configuration, preferably as segments which are substantially involute curves, and the carrier is also curved to form a cylindrical shell enclosing the corrugated and flat strips. The corrugated and flat strips extend from the shell inward, towards a central region. The strips may be attached to a tube, or other central member, or their equivalent, located at or near the central region. There should be a sufficient number of flat and corrugated strips such that these strips occupy substantially all of the cross-section of the resulting monolith, between the central region and the shell.

In the most general case of the present invention, at least one of the attachment angle and the skew angle are nonzero. In the preferred embodiment, at least the attachment angle is nonzero. In another preferred embodiment, the skew angle is nonzero but less than or equal to the attachment angle. In still another preferred embodiment, the skew angle is approximately half the attachment angle.

The choice of the attachment angle, and to a much lesser extent, the skew angle, affects the shape of the inlet and outlet faces of the monolith, because such choices affect how the stack of strips will "want" to wind up when they are curved to form the monolith described above. The attachment and skew angles ultimately determine the direction in which gas flows out of the monolith, at any given point along its outlet face. In general, the nonzero attachment angle produces a geometry wherein the gas flow channels, at the outlet face of the monolith, point in different directions, depending on the location of each channel. This effect produces swirl in the gas exiting the monolith.

The invention also comprises methods of making the monolith described above. In one method, designated the "outside in" technique, a stack of pairs of flat and corrugated strips are attached to a carrier strip, at an attachment angle. The flat and corrugated strips are then arranged to form curves, extending inward to a central region, while the carrier strip is itself curved to form a cylindrical shell enclosing the flat and corrugated strips. In the final product, the flat and corrugated strips occupy substantially all of the cross-section of the monolith between the central region and the shell.

In the "inside out" technique, the monolith is built up from the inside, the flat and corrugated strips being attached first to a central member, located at the central region, at a particular attachment angle. The strips are then curved and attached to the carrier strip. With either method of assembly, the final structure is the same.

The present invention therefore has the primary object of providing a monolith which imparts swirl to a gas stream.

The invention has the further object of providing a monolith as described above, wherein the monolith may have a catalyst coating, or wherein the monolith may be uncoated.

The invention has the further object of providing a method of making a monolith which imparts swirl to a gas stream.

The invention has the further object of providing a method as described above, wherein the degree of swirl imparted can be controlled by selection of parameters.

The invention has the further object of improving the efficiency of combustion, by providing an effective method and product for imparting swirl to a combustion gas stream.

The invention has the further object of stabilizing a downstream flame in a catalytic combustor, thereby helping to prevent flashback which can, over time, destroy a combustion catalyst.

The invention has the further object of providing a monolith having a central channel through which additional fuel can pass, to support additional combustion downstream.

The reader skilled in the art will recognize other objects and advantages of the invention, from a reading of the following brief description of the drawings, the detailed description of the invention, and the appended claims.

BRIEF DESCRIPTION OF THE DRAWINGS

FIG. 1 provides a cross-sectional view of a monolith made according to the prior art.

FIGS. 2a–2c provide diagrams representing the major steps in the assembly of the monolith of FIG. 1.

FIG. 3a provides a plan view of a corrugated strip used in making the monolith. FIG. 3b provides a diagram showing the attachment of a plurality of strips to a carrier. FIG. 3c provides an end view, illustrating the attachment of the strips to the carrier. FIG. 3d provides a cross-sectional view of the monolith made by curving the strips and the carrier, and enclosing them within the carrier. FIG. 3e provides a cross-sectional view of the monolith, showing the shape of the regions occupied by the curved strips, and showing the shape of the central region.

FIGS. 8a–8e provide diagrams similar to those of FIGS. 3a–3e, respectively, but illustrate a prior art structure in which there is no skew in the strips, and in which the longitudinal axis of the strip is parallel to that of the carrier.

FIGS. 10a and 10b provide diagrams illustrating another way of fabricating the embodiment of FIGS. 5a–5e.

DETAILED DESCRIPTION OF THE INVENTION

Figure 3C:
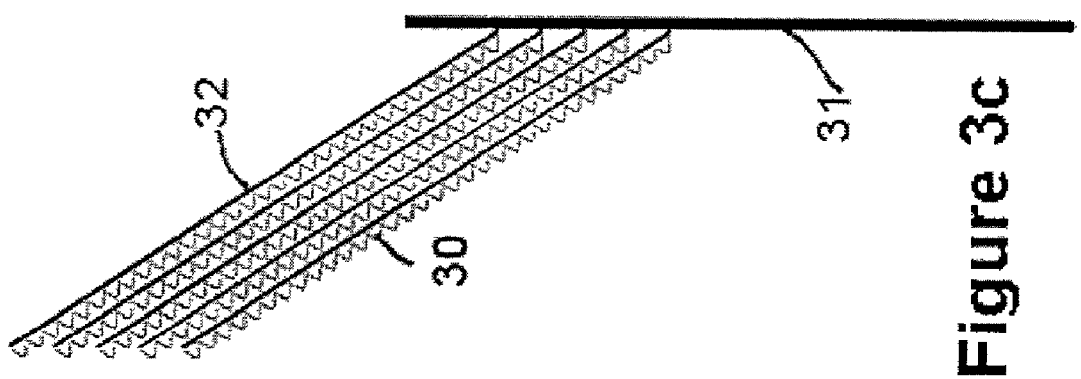
FIGS. 3a–3e provide diagrams illustrating the assembly of a monolith according to one embodiment of the present invention.

The monolith of the present invention is made from a plurality of substantially identical pieces of flat and corrugated metallic layers. These pieces, of which there may be up to 100 or more in a given monolith, are arranged to form curved segments which approximate involute curves, so as to fill a major portion of a circular cross-section of the monolith, generally leaving a void in a central region.

To understand the structure of the monolith of the present invention, it is helpful to review the structure of the prior art. FIG. 1 shows, in a cross-sectional view, a monolith formed as described above. A plurality of alternating flat and corrugated sheet metal pieces, or strips, are held within a shell or carrier 1, also preferably made of sheet metal, and define a central region 2. For convenience of illustration, FIG. 1 shows only the flat strips 3 through most of the cross-section of the monolith, but portions of the corrugated strips 4 are visible in a fragment shown in the figure. The strips form approximate involute curves which extend from the central region to the outer shell. This is the structure described in more detail in U.S. Pat. No. 5,820,835, cited above. In the cited patent, the pieces are cantilevered, insofar as the pieces are affixed to the outer shell, but are not affixed to any structure at the central region.

FIGS. 2a, 2b, and 2c illustrate a process of assembly of the structure of FIG. 1. FIG. 2a represents the affixation of the alternating flat and corrugated strips to carrier 21. FIG. 2b represents the bending of the strips to form the approximate involute curves, with one end of each strip still being affixed to the carrier and the other end being free. FIG. 2c shows the process near completion, with the ends of the carrier approaching each other and nearly ready to be joined. When its ends are joined together, the carrier becomes the outer shell 1 of FIG. 1.

The same process is illustrated in FIGS. 8a–8e. FIGS. 8a–8e, though they describe a prior art structure, are useful in establishing a frame of reference for understanding the present invention.

Figure 8C:
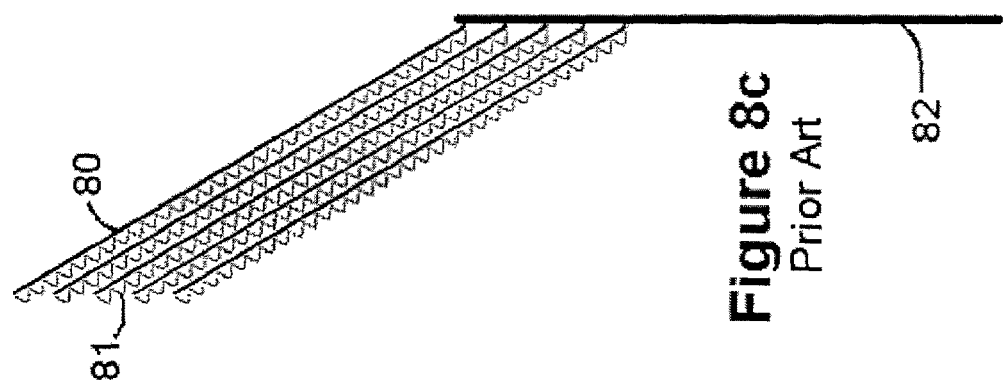
Figure 8B:
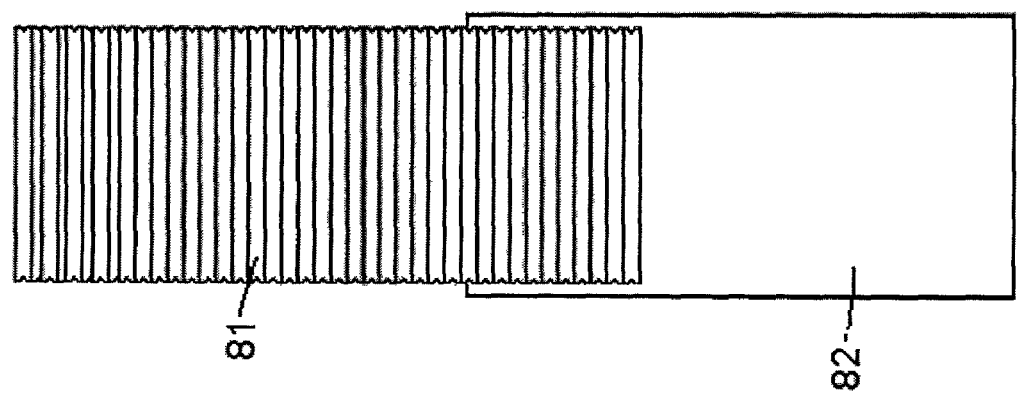
Figure 8A:
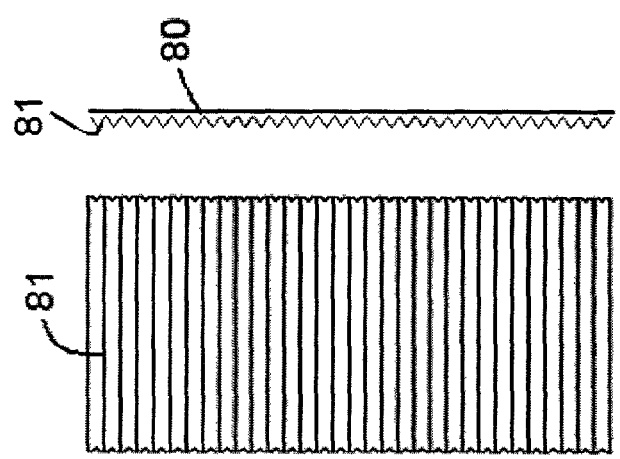

FIG. 8a shows a top view and an end view of the strips used to form the monolith. The end view shows flat layer 80 and corrugated layer 81; the monolith is built up of such pairs. The corrugated layers hold the flat strips apart, defining channels through which gas can flow.

FIG. 8b shows the strips being attached to carrier strip 82. Note that in this prior art structure, the longitudinal axis of each strip is parallel to the longitudinal axis of the carrier. Also, the corrugations are perpendicular to the longitudinal axis of the strip.

FIG. 8c shows an end view, illustrating the attachment of a plurality of pairs of flat and corrugated strips to the carrier or carrier strip 82.

FIG. 8d shows, in simplified cross-section, the finished monolith, wherein the pairs of flat and corrugated strips have been arranged to form curved segments, which approximate involute curves, extending from a central region 83 to the carrier 82. In FIG. 8d, the carrier has been curved such that its ends are joined, so that the carrier has become a cylindrical shell. In the view of FIG. 8d, the direction of gas flow is perpendicular to the paper.

FIG. 8e provides a schematic cross-section indicating the presence or absence of flat and corrugated strips through the body of the monolith. In the view of FIG. 8e, the direction of gas flow is horizontal, i.e. either from left to right, or from right to left. The shaded areas 84 represent portions of the cross-section which are occupied by the flat and corrugated strips. The unshaded region between shaded areas 84 corresponds exactly to central region 83, i.e. a region in which there are no strips in the path of gas flow.

The monolith shown in FIGS. 8a–8e defines inlet and outlet faces, which comprise the functional boundaries of the monolith. If gas flows from left to right, in the view of FIG. 8e, the inlet face comprises border 85 and the outlet face comprises border 86.

The monolith of the present invention differs from that of the prior art discussed above, in at least one of two ways. First, in the present invention, the longitudinal axes of the strips, at the point of attachment to the carrier, are oblique to the longitudinal axis of the carrier. Secondly, in the present invention, the corrugations may be skewed relative to the longitudinal axis of the strip.

Figure 3B:
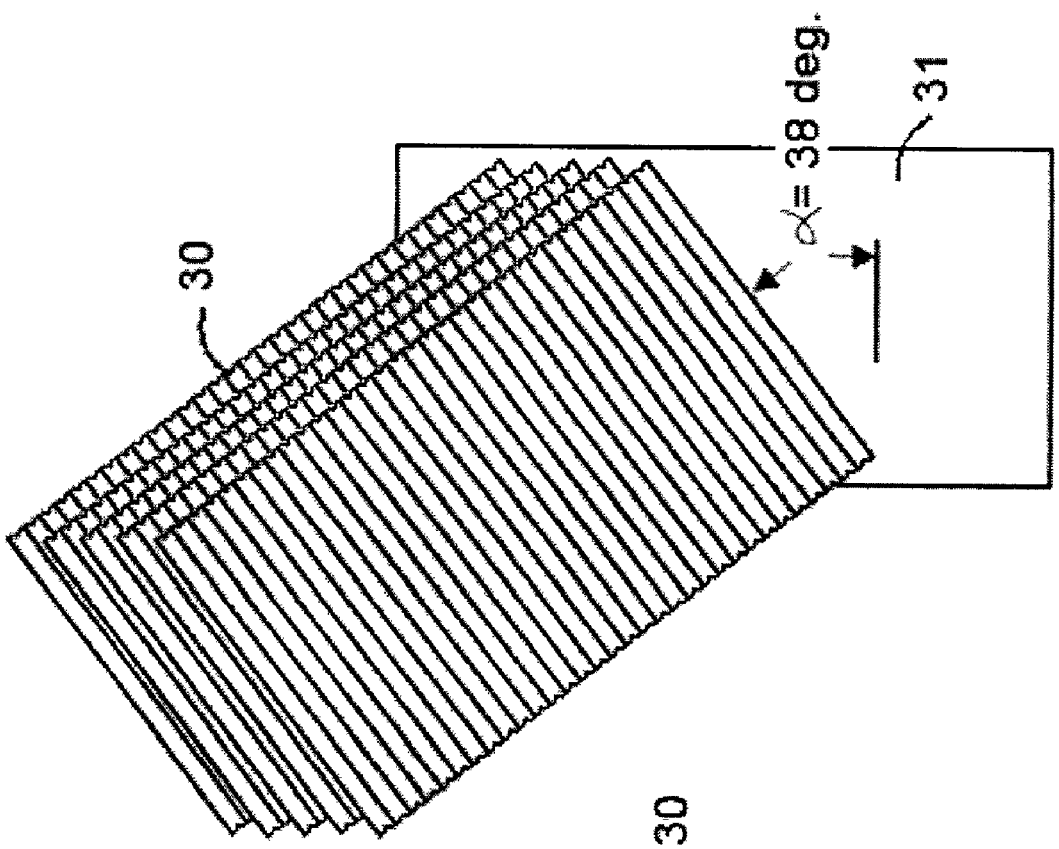
Figure 3A:
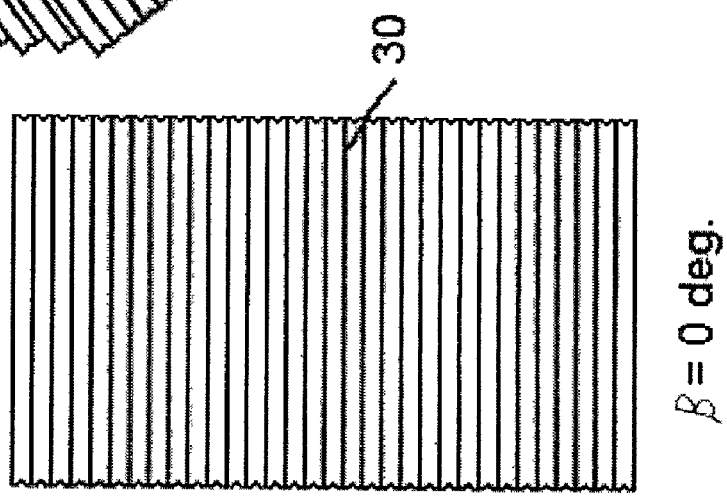

FIGS. 3a–3e show the construction of one embodiment of the monolith of the present invention. FIG. 3a shows corrugated sheet metal strip 30. A stack of such corrugated strips, alternating with flat sheet metal strips, forms the monolith. Note that, in FIG. 3a, there is no skew, i.e. the corrugations are perpendicular to the longitudinal axis of the strip.

FIGS. 3b and 3c show the stack of alternating flat and corrugated strips being attached to a sheet metal carrier strip 31. For convenience of illustration, FIG. 3b shows only corrugated strips 30, but the end view of FIG. 3c explicitly shows the corrugated strips 30 and the flat strips 32. As shown in FIG. 3b, the stack of strips is attached at an angle α. More precisely, the longitudinal axes of the strips forming the stack forms angle α relative to the longitudinal axis of the carrier 31. In the example of FIG. 3b, angle α is 38°, but the invention is not limited by the exact value of this angle.

It was noted above that the corrugations in FIG. 3a are not skewed. The skew angle, defined as the angle made by the corrugations relative to the transverse axis of the strip, is denoted as angle β. In the example of FIG. 3a, there is no skew, and β is zero.

The structure of FIG. 3b or 3c can be made into the monolith of the present invention by curving the free ends of the strips which define the stack, while also forming the carrier into a cylindrical shell. The curved strips form segments which are substantially involute curves, extending from a central region 33 (FIG. 3d) to the outer shell. This process is essentially the same as that shown and described in U.S. Pat. No. 5,820,835, described above, except that due to the angle made by the stack relative to the carrier, the layers have a natural path that they "want" to follow, and the resulting structure is different from those shown in the cited patent.

Figure 3D:
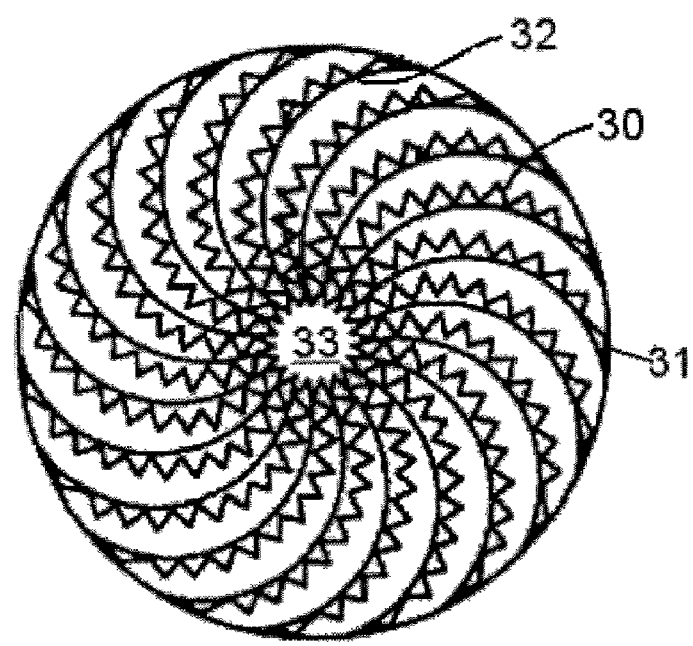

For purposes of illustration, FIGS. 3b and 3c show a stack having only a few layers. In practice, there should be enough layers such that the stack, when formed into segments of approximate involute curves, will fill completely the space between central region 33 and the cylindrical shell defined by the carrier, as illustrated in FIG. 3d. Thus, there will be far more layers than are explicitly shown in FIGS. 3b and 3c.

FIG. 3d shows the general appearance, in cross-section, of the final structure. For convenience of illustration, only a relatively small number of curved strips are shown. In FIG. 3d, carrier 31 has been curved in a circular manner, and its ends have been joined together so that the carrier defines a cylindrical shell. FIG. 3d also shows central region 33, which can be defined as the area into which the curved layers do not extend.

Figure 3E:
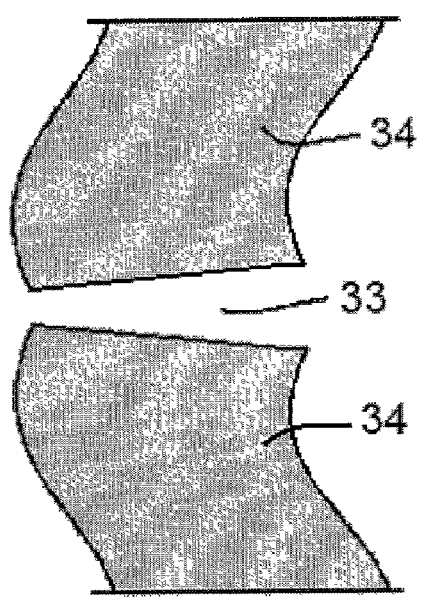

FIG. 3e shows a schematic cross-section of the resulting monolith. This cross-section is taken in a direction perpendicular to that of FIG. 3d, such that in FIG. 3e, the direction of gas flow is horizontal, such as from left to right. The shaded portions 34 of FIG. 3e symbolize those portions of the monolith that are occupied by the curved stack of strips. The unshaded portion 33 is the same as central region shown in FIG. 3d. FIG. 3e shows how the shape of the monolith is influenced by the angle α of FIG. 3b. The central region 33 is not cylindrical but more conical, and the inlet and outlet faces of the monolith are not flat but curved. The structure of FIG. 3e assures that a swirl will be imparted to gas flowing through the channels defined by the curved layers. The amount of swirl is determined primarily by the value of angle α, i.e. the angle made by each strip relative to the carrier to which it is attached. This attachment angle translates into an angle formed by each channel, at the outlet face, relative to the horizontal, and the latter angle determines the path taken by the exiting gas. In the monolith of the present invention, the exiting gas is directed along widely disparate paths, depending on the location of each particular channel on the outlet face. The overall path taken by the exiting gas may be described as approximately helical.

Figure 4C:
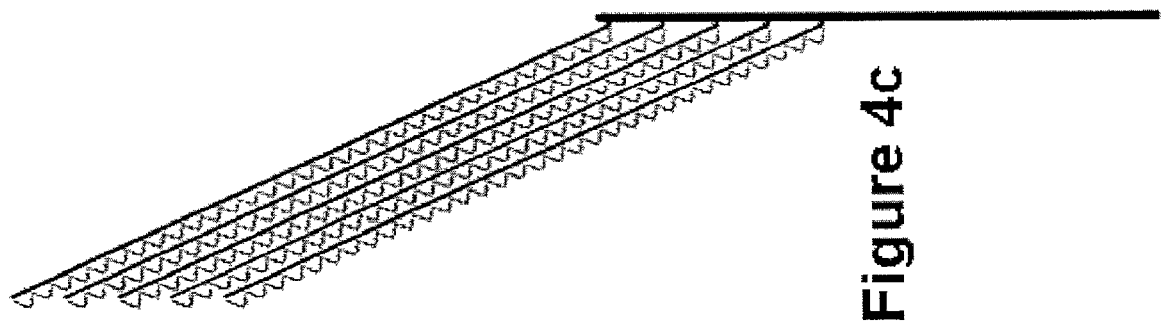
FIGS. 4a–4e provide diagrams similar to FIGS. 3a–3e, respectively, illustrating an embodiment of the invention wherein the corrugations in the strips are skewed, and wherein the strips are attached to the carrier at an angle identical to the skew angle.
Figure 4B:
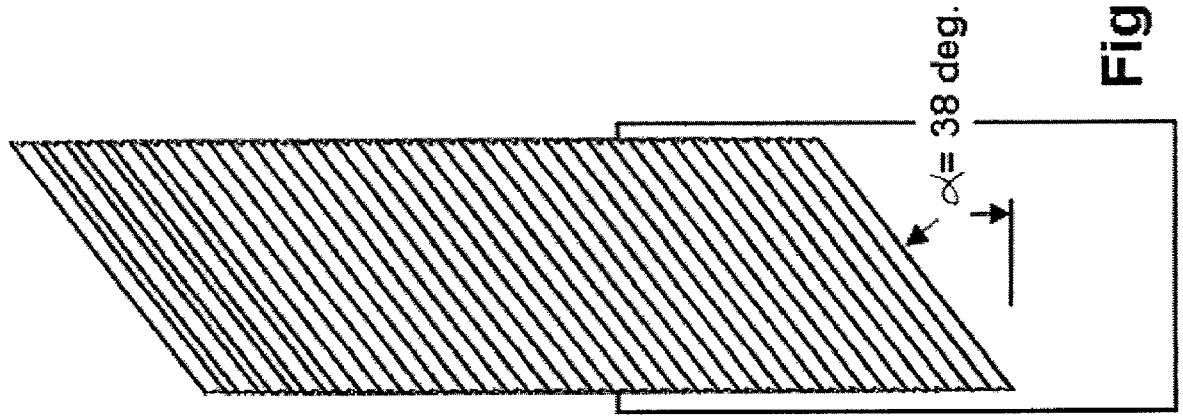
Figure 4A:
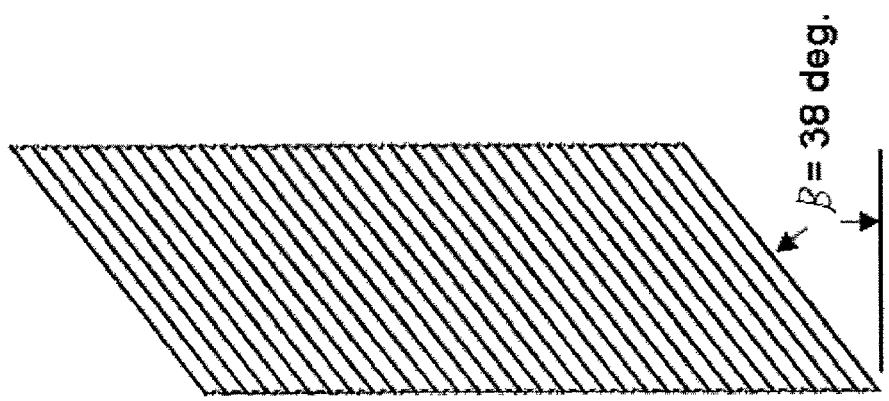
Figure 4D:
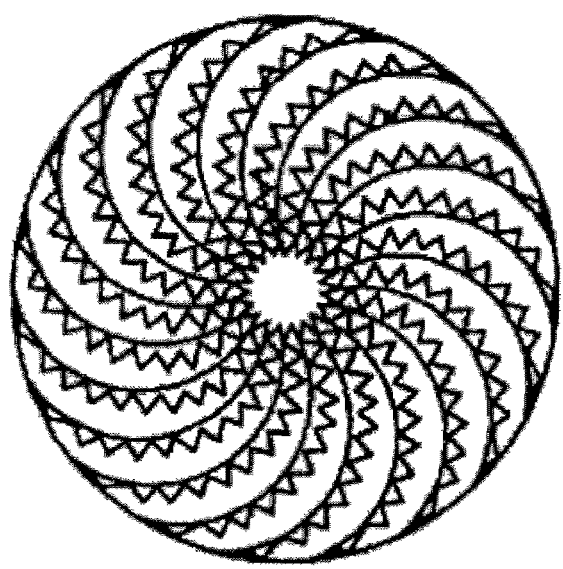
Figure 4E:
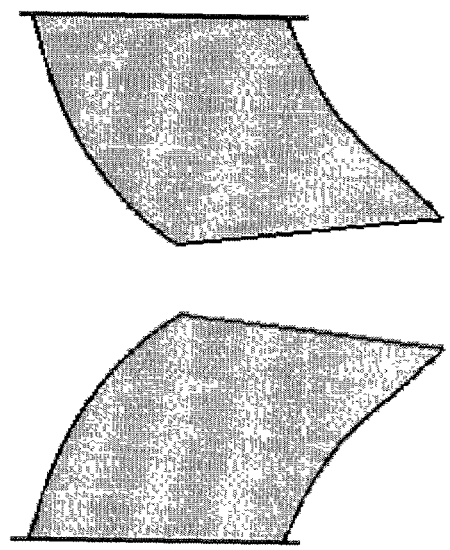

FIGS. 4a–4e illustrate another embodiment of the present invention. These figures show views which correspond to those of FIGS. 3a–3e, respectively. In this embodiment, the corrugated foil is skewed, as shown in FIG. 4a. Unlike FIG. 3a, the angle of skew in FIG. 4a, denoted by angle β, is nonzero. In the example shown in FIGS. 4a–4e, the skew angle is the same as the angle of attachment, α, namely 38°. The addition of the skewed corrugations changes the cross-section of the monolith, as shown in FIG. 4e. The view shown in FIG. 4d is shown to be the same as FIG. 3d. In practice, there are very subtle differences in these views, but such differences are not conveniently illustrated. The amount of swirl is similar to that of the embodiment of FIGS. 3a–3e, as the swirl depends, to a large extent, on angle α.

Figure 5C:
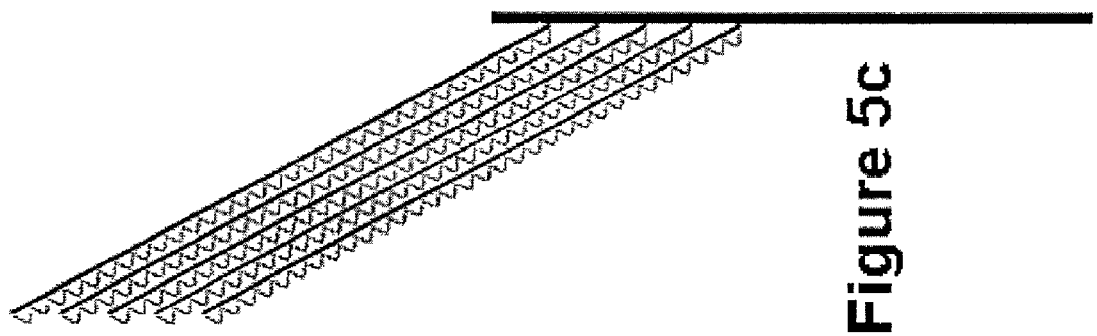
FIGS. 5a–5e provide diagrams similar to FIGS. 4a–4e, respectively, and illustrate an embodiment of the invention wherein the skew angle differs from the angle of attachment between the strips and the carrier.
Figure 5B:
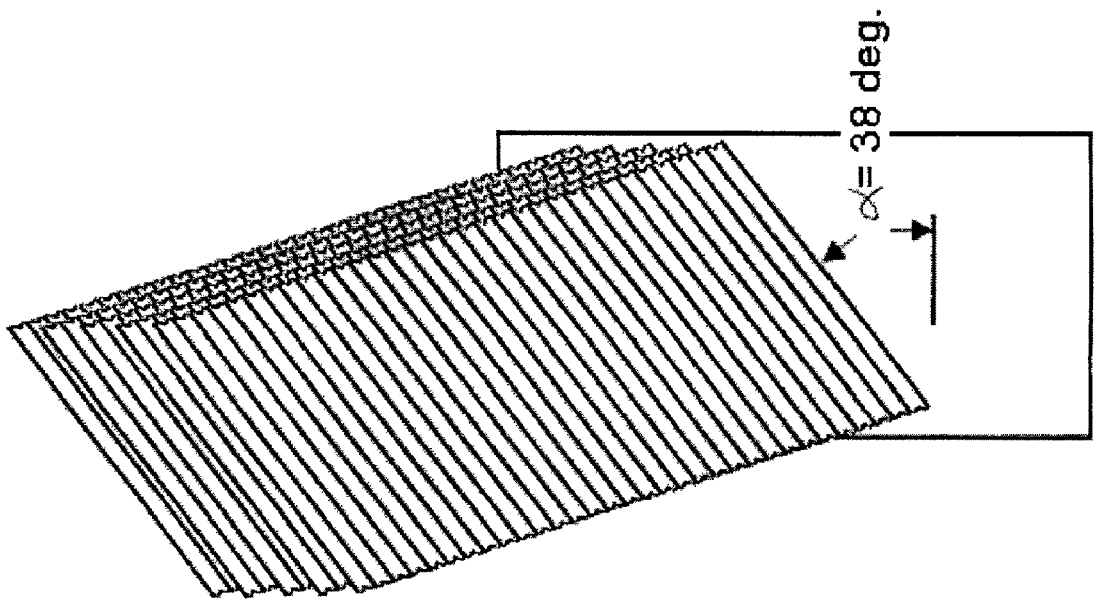
Figure 5A:
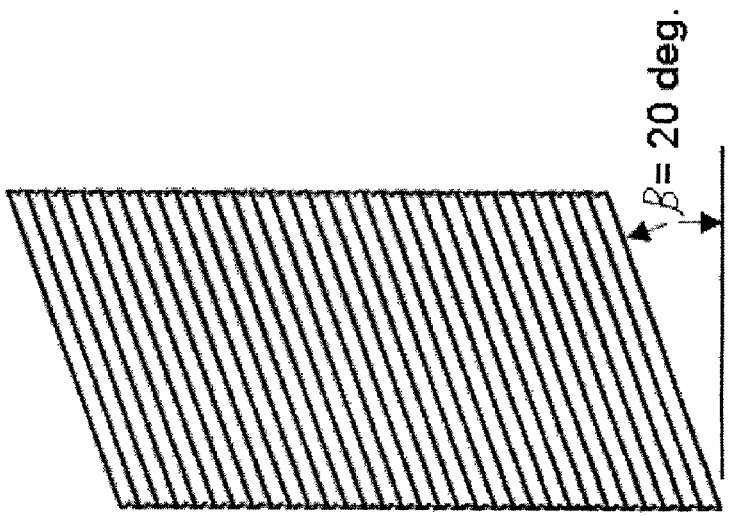
Figure 5D:
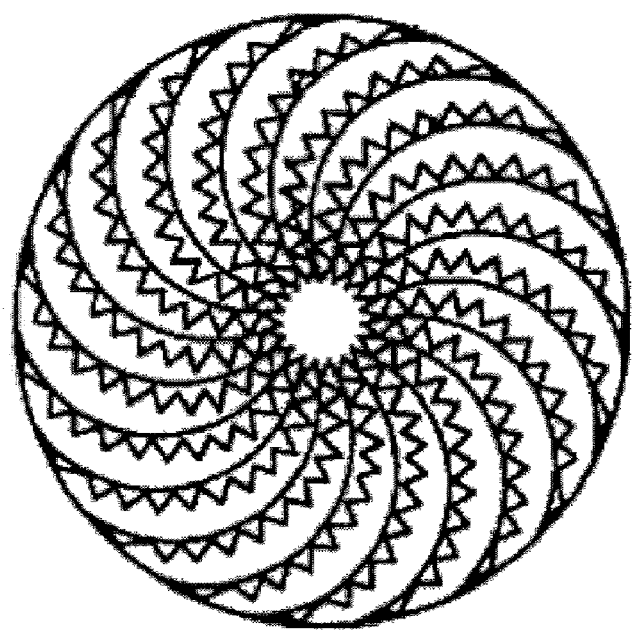
Figure 5E:
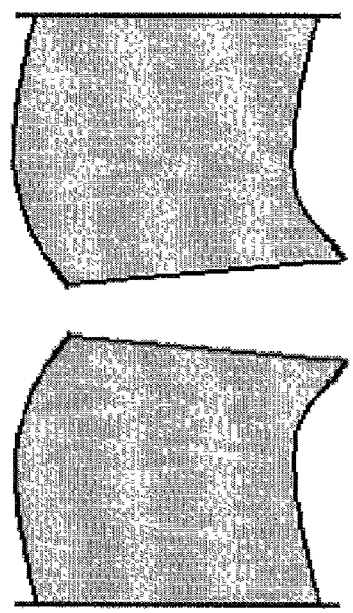

FIGS. 5a–5e show another embodiment of the present invention. These figures again correspond, respectively, to FIGS. 3a–3e. An ideal cross-section of the monolith has planar faces, and a central region having a generally constant diameter. In the embodiments of FIGS. 3a–3e and FIGS. 4a–4e, the inlet and outlet faces of the monolith depart substantially from a plane perpendicular to the direction of gas flow, and the central region is more conical than cylindrical. The embodiment of FIGS. 5a–5e addresses the need for more planar faces. In this embodiment, the attachment angle α is the same as before, but the skew angle β is roughly half of α. In this example, β is 20°. This change in the skew angle affects the manner in which the layers "want" to become rolled up, and the result is the cross-section shown in FIG. 5e. In this case, the inlet and outlet faces are more nearly planar, within 0.5 inches on a six-inch diameter prototype. As in the two preceding embodiments, the center hole is still conical, but the amount by which the center hole differs from a right circular cylinder is somewhat less than in the previous embodiments. FIG. 5d is shown the same as FIGS. 3d and 4d, with the understanding that there again may be subtle differences that are not represented in these figures.

Figure 6A:
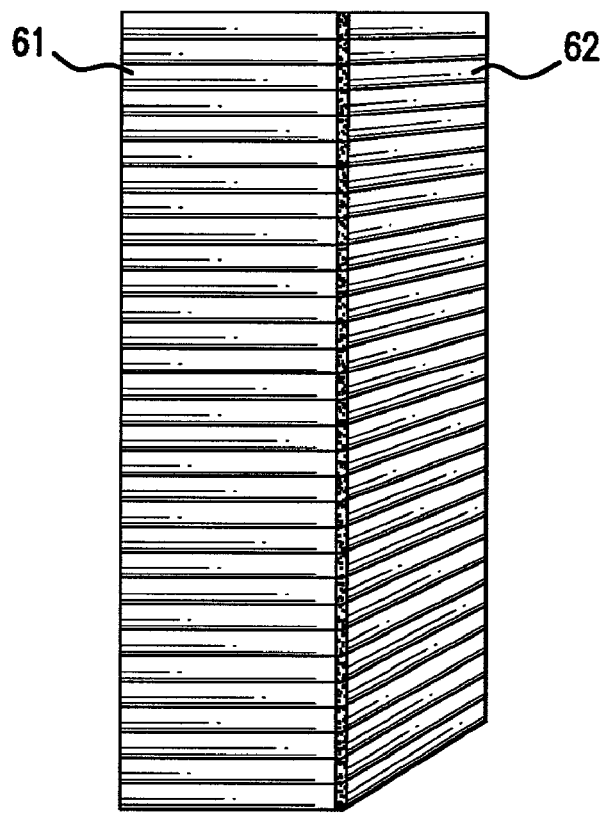
FIGS. 6a–6e provide diagrams similar to FIGS. 3a–3e, respectively, illustrating an embodiment of the invention wherein each strip comprises a rectilinear portion and a skewed portion.
Figure 6C:
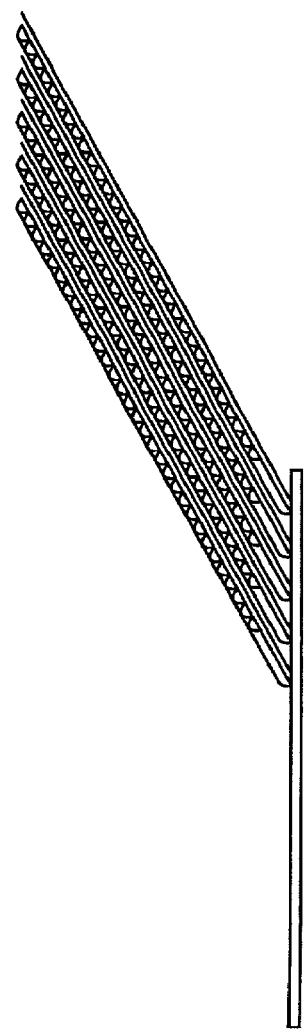
Figure 6B:
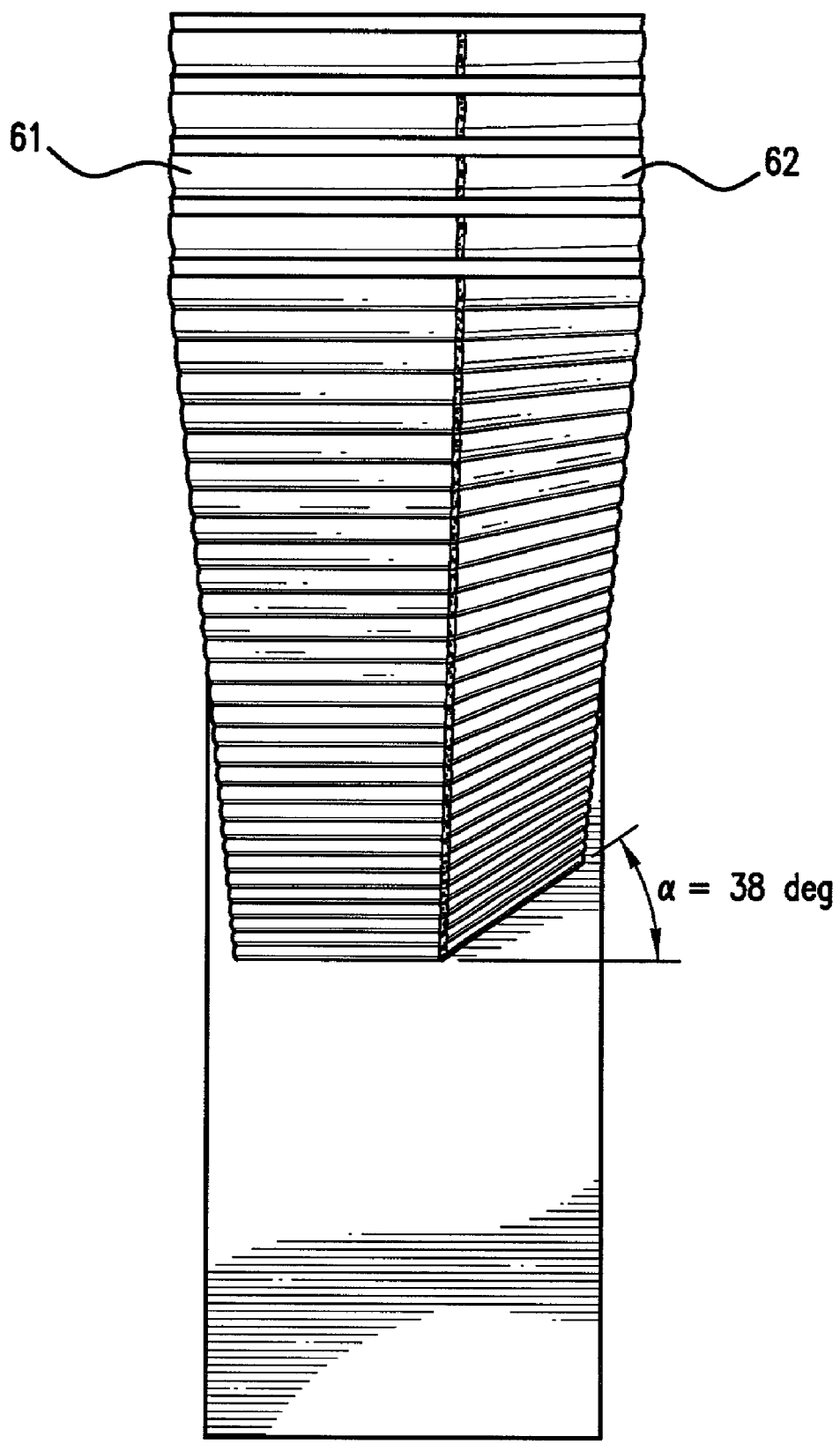
Figure 6D:
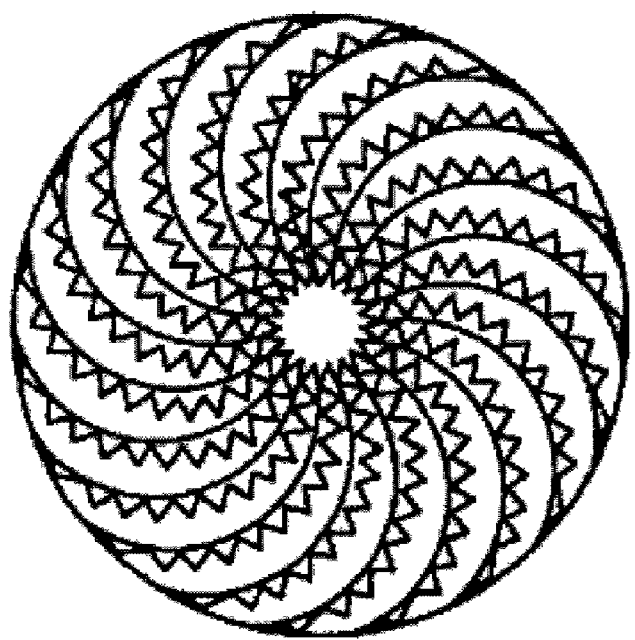
Figure 6E:
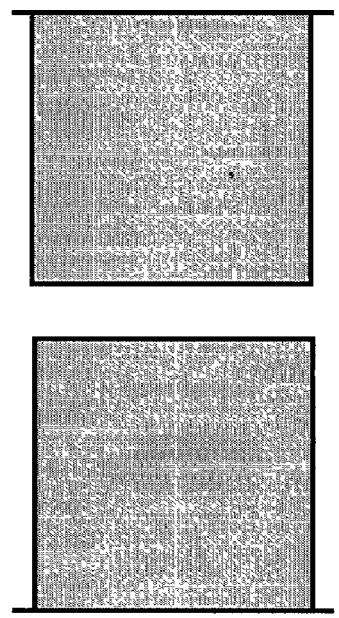
Figure 6F:
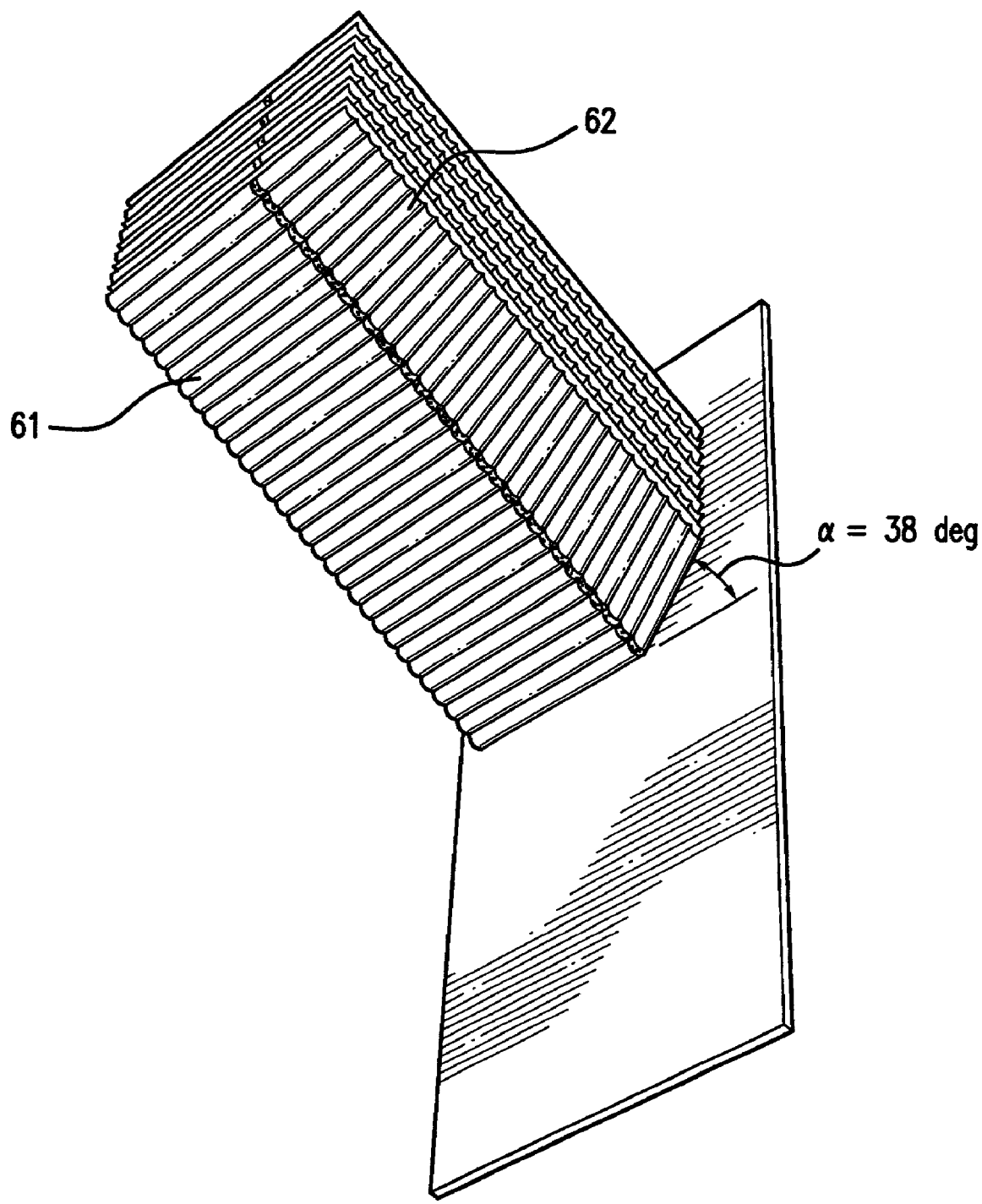
FIG. 6f provides a perspective view of this embodiment.
Figure 7A:
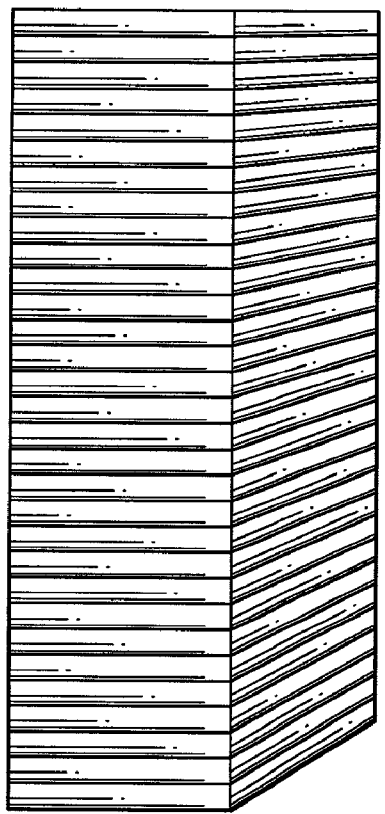
FIGS. 7a–7e provide diagrams similar to FIGS. 6a–6e, respectively, illustrating an embodiment of the invention wherein the rectilinear portion and the skewed portion are integrally formed.
Figure 7C:
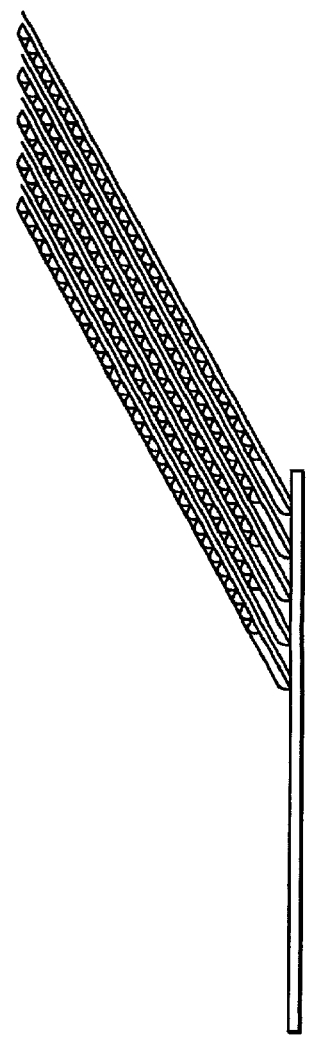
Figure 7B:
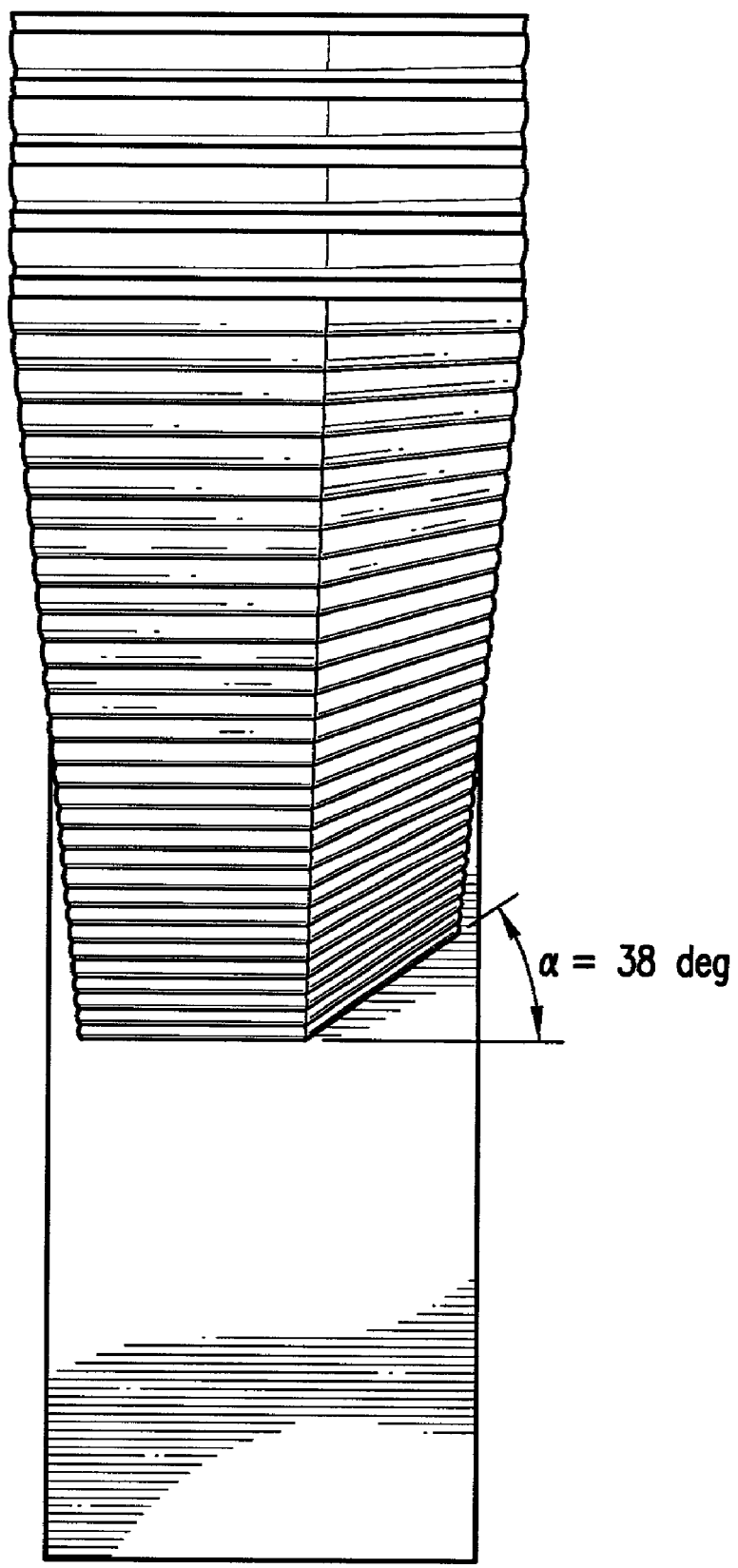
Figure 7D:
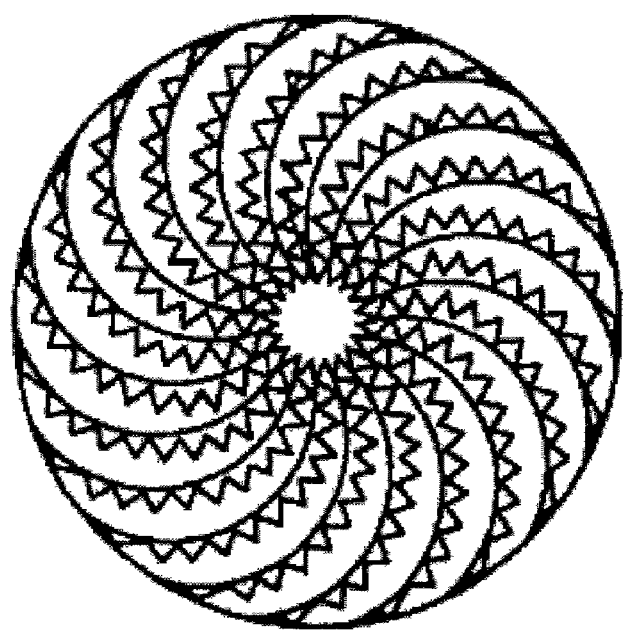
Figure 7E:
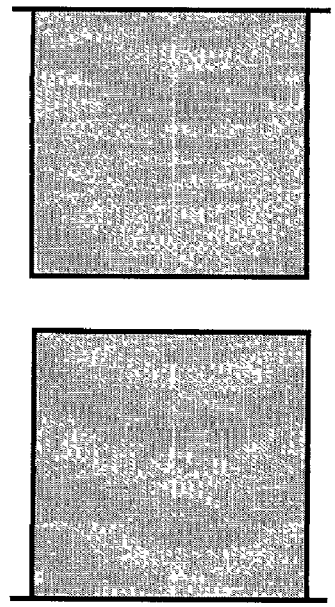
Figure 7F:
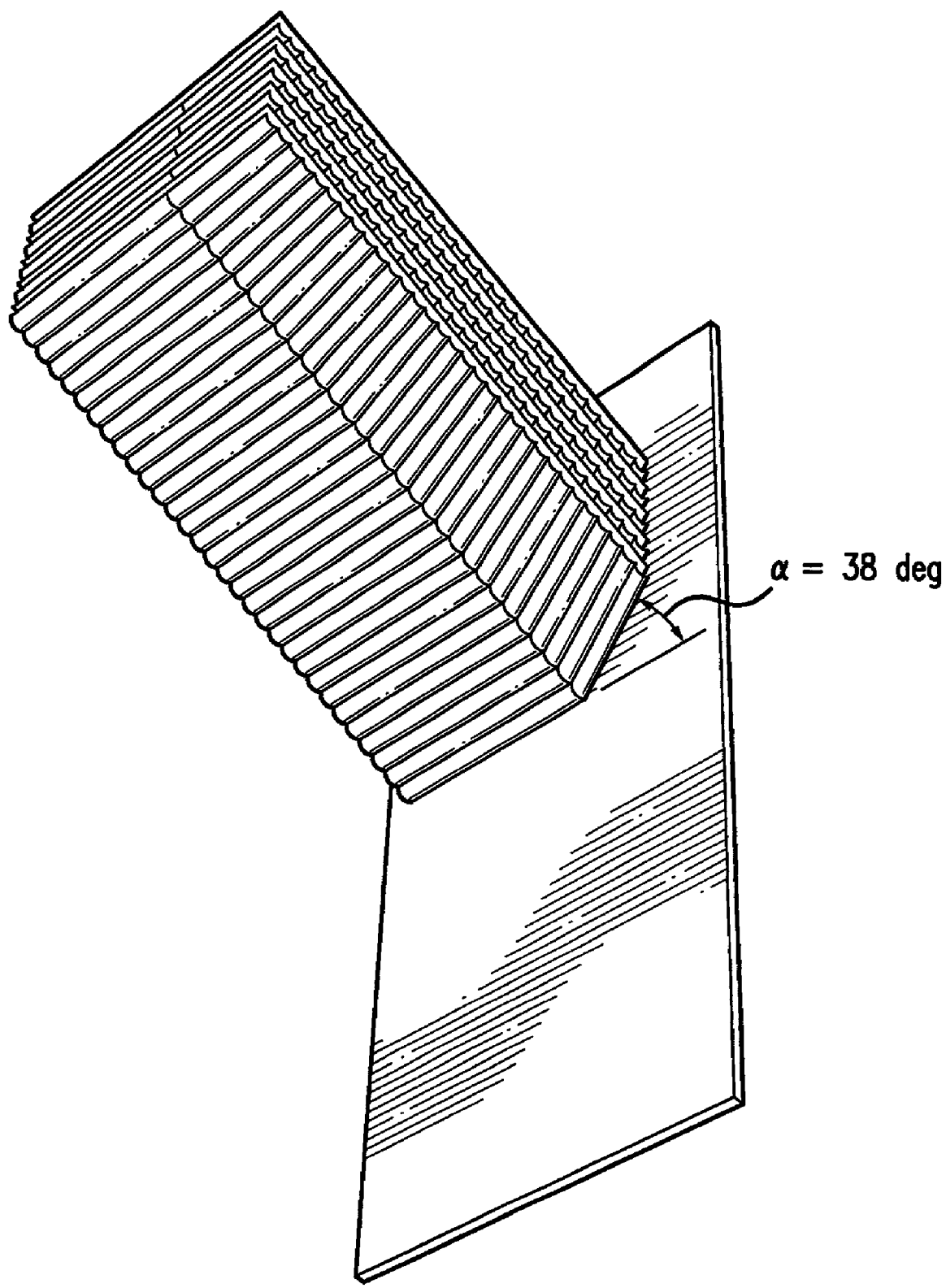
FIG. 7f provides a perspective view of this embodiment.

FIGS. 6a–6f show another embodiment of the present invention. FIGS. 6a–6e correspond, respectively, to FIGS. 3a–3e, while FIG. 6f is an additional perspective view. This embodiment provides a swirl, while also providing a cylindrical central region. In this embodiment, a straight corrugated strip 61 is joined to a skew corrugated strip 62 to form a compound strip. The skew corrugated strip 62 has an angle that starts at zero at one end (the top, in the views of FIGS. 6a and 6b) and becomes a nonzero angle α at the other end (the bottom, in FIGS. 6a and 6b). The corrugation height gradually increases, both from top to bottom and from left to right, as a consequence of the formation of the skewed piece, but the amount of increase is very slight, and is not shown in the drawings. The width of the straight piece may be about twice the width of the skew piece. The pieces are welded to a common flat piece which holds the shape of the illustrated pieces while one distorts the second piece to form the skew effect. The common flat piece, in the embodiment of FIGS. 6a–6e, is the same as the flat piece which alternates with the corrugated pieces, to define the gas flow channels. When assembled, the wider straight-cell piece will generally govern the finished cross-section, and produce a typical cylindrical monolith having nearly planar faces.

FIG. 6f provides a perspective view of the set of compound strips, attached to a carrier strip. The purpose of FIG. 6f is to provide another graphic depiction of this embodiment; the views of FIG. 6a and 6b can be interpreted to give a misleading impression of depth. All of these views are intended to depict the same embodiment, namely that in which a straight strip is joined to a skewed strip, and wherein each straight strip and its associated skewed strip lie in essentially the same plane. That the strips lie in the same plane is apparent from the end view of FIG. 6c.

Unlike the embodiments previously described, the flow direction in FIG. 6e may only be from left to right, as shown in the drawing. If gas were to flow from right to left in this embodiment, the monolith would not impart a swirl, because the swirl is imparted by the shape of the last segment "seen" by the gas. If gas were to flow from right to left, the last segment "seen" by the gas would be straight, and not curved, and there would be no swirl.

FIGS. 7a–7f illustrate another embodiment of the present invention. This embodiment is functionally equivalent to that of FIGS. 6a–6f, except that, instead of joining two separate pieces, the straight and skew corrugations are formed on the same piece of foil, using special tooling. As in the embodiment of FIGS. 6a–6f, the direction of gas flow must also be from left to right, for the same reason. The embodiment is otherwise the same as previously described.

Figure 9:
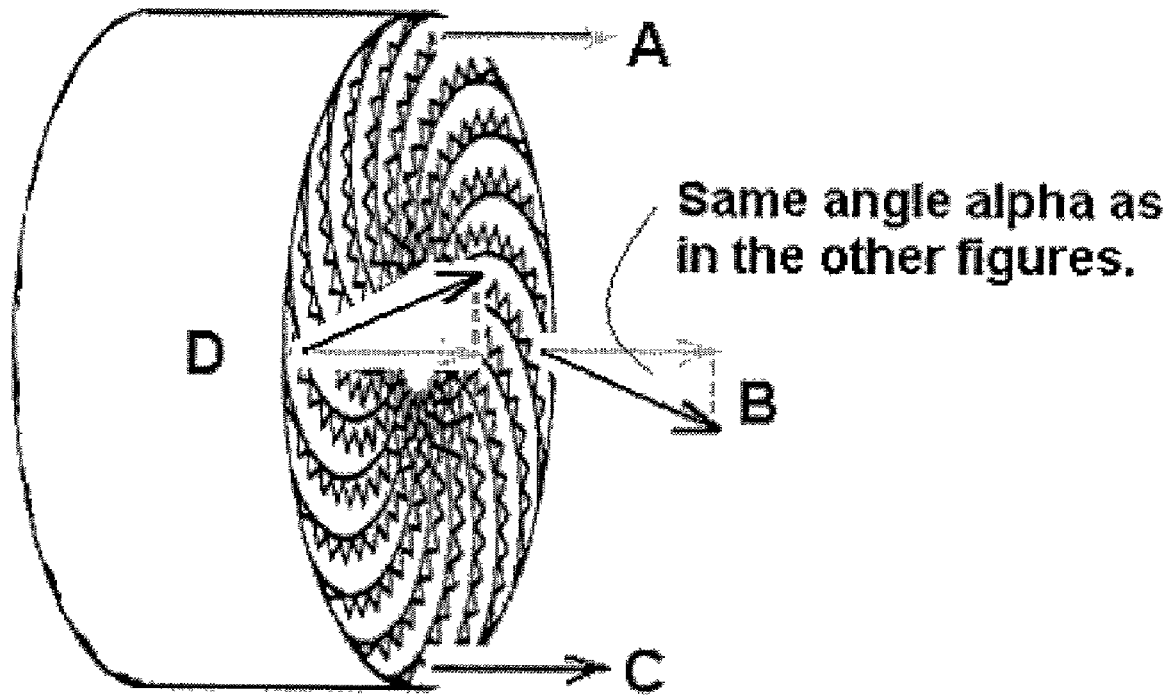
FIG. 9 provides a perspective view of a monolith made according to the present invention, illustrating the direction in which gas is induced to travel, at representative locations along the outlet end of the monolith.

FIG. 9 illustrates the production of swirl in the present invention. The monolith shown in FIG. 9 is intended to represent, generically, all embodiments of the present invention. The angle α, illustrated at different points on the face of the monolith, determines the amount of swirl. The angle α is the same as that described with respect to all embodiments of the present invention. The direction of gas flow depends on α, and on the position on the monolith. At the position designated A, the gas flow is into the paper. At the position designated B, the gas flow is down. At position C, the gas flow is out of the paper, and at position D, the gas flow is up. Thus, the gas exiting the monolith is directed in virtually every direction, thereby creating swirl.

The monolith of the present invention need not be made in the same way as suggested in U.S. Pat. No. 5,820,835, i.e. with the distal ends loose. In fact, it is strongly preferred that both the proximal ends (the ends of the strip that abut the carrier) and the distal ends (the ends that are adjacent the central region) be attached to an anchoring member. The proximal ends are attached to the carrier strip, as described above. The distal ends may be attached to a central member which defines the central region. The monolith can then be built from the "inside out", instead of from the "outside in".

FIGS. 10a and 10b illustrate an "inside out" technique of assembly of the embodiment of FIGS. 5a–5e. For clarity of illustration, only six pairs of flat and corrugated strips are shown. As shown in FIG. 10a, pairs of strips comprising flat strips 102 and corrugated strips 103 are attached, at an appropriate angle and spacing, preferably by welding, to a central member 101 which becomes the boundary of the central region in the final product. The pairs of strips are then wound around the central member, forming the shapes shown in the other figures. The proximal ends of the strips (i.e. the loose ends, in this method of fabrication) are then attached to the carrier strip. FIG. 10b represents the attachment of one of these strips to the central member, at a preferred angle. For clarity of illustration, FIG. 10b does not show additional strips. Note that, in this embodiment, the angle of attachment of the strips to the carrier is determined by the angle of attachment to the central member. Once the strips have been attached to the central member, at a given angle, they "want" to become wound in only one way, and the strips therefore form an angle with the carrier which is fully determined.

The "outside in" technique is more effective for purposes of study, because it allows one to predict the swirl at the outlet face more easily, while studying the various boundary conditions of the central region and the inlet and outlet faces. But the "inside out" technique is easier to use in commercial manufacturing.

While it would be convenient to form the central member 101 as a cylindrical tube, as shown in FIG. 10a, doing so may not always be practical, because the shape of the central member will determine how the layers of strips will wrap around it to form a monolith. As shown in the embodiments of FIGS. 3a–3e, 4a–4e, and 5a–5e, the central region is typically not cylindrical for various typical combinations of the angles α and β. Therefore, forcing the central region to be cylindrical, by causing it to be bounded by a cylindrical tube, may impart an undesired shape to the remainder of the monolith. Thus, in general, the central member will assume non-cylindrical shapes, as dictated by the desired shape of the finished structure. Such shapes could be conic, hourglass shaped, some combination of these, or other, more irregular shapes.

The strips forming the monolith may be coated on one or both sides with a catalyst, in which case the monolith comprises a catalytic combustor which also imparts swirl to the gas flowing through it. The strips may also be uncoated, in which case the monolith performs the sole function of imparting swirl.

The central region defined by the monolith may be plugged, or it may be used as a passageway, such as for an alternate fuel injector. It could also be used as a cooling passage.

In all embodiments, the preferred means of attachment of the strips to the carrier, and to the central member, if present, is by welding. However, the invention is not necessarily limited to this means of attachment, and should be interpreted to include equivalent methods.

The invention can be modified in various ways. Inherent to the present invention is the variation of angles α and β, to achieve various cross-sections of the monolith. Also the member used as a boundary for the central region may assume different shapes. This central member need not be a hollow structure, but could be a solid piece, or some other structure capable of attachment to the various strips. These and other modifications, which will become apparent to the person skilled in the art, should be considered within the spirit and scope of the following claims.

What is claimed is:

1. A monolith for imparting swirl to a gas stream, comprising:
   a) a plurality of strips defining channels for gas flow, the strips having distal and proximal ends, each strip having a longitudinal axis,
   b) the proximal ends of the strips being attached to a carrier along a line of intersection between the strip and the carrier, the carrier having a longitudinal axis, wherein the strips are attached such that the line of intersection is oblique to the longitudinal axis of the carrier,
   c) the carrier being curved to form a cylindrical shell which encloses the strips, and
   d) the strips being curved, from their proximal ends which are attached to the carrier, to their distal ends which extend to a central region.

2. The monolith of claim 1, wherein the strips include alternating corrugated and flat strips, and wherein the corrugated strips include skewed corrugations.

3. The monolith of claim 2, wherein the skewed corrugations define a skew angle which is not greater than an angle formed by the longitudinal axis of the strips, in a vicinity of the carrier, and the longitudinal axis of the carrier.

4. The monolith of claim 2, wherein the skewed corrugations define a skew angle which is approximately half an angle formed by the longitudinal axis of the strips, in a vicinity of the carrier, and the longitudinal axis of the carrier.

5. The monolith of claim 1, wherein the strips include alternating corrugated and flat strips, and wherein the corrugated strips have zero skew.

6. The monolith of claim 1, wherein there are a sufficient number of strips such that substantially all of a cross-section of the monolith, between the central region and the shell, is occupied by the strips.

7. The monolith of claim 1, wherein the curved strips define approximate involute curves.

8. The monolith of claim 1, wherein the central region is bounded by a central member to which the distal ends of the strips are attached.

9. A monolith for imparting swirl to a gas stream, comprising:
   a) a plurality of strips defining channels for gas flow, each strip having two ends and a longitudinal axis,
   b) the strips being attached, at one of said ends, to a carrier, along a line of intersection between the strip and the carrier, the carrier having a longitudinal axis, wherein the line of intersection is oblique to the longitudinal axis of the carrier,
   c) wherein the strips extend from the carrier to a central region, and
   d) the carrier being curved to form a cylindrical shell which encloses the strips and the central region.

10. The monolith of claim 9, wherein the strips include alternating corrugated and flat strips, and wherein the corrugated strips include skewed corrugations.

11. The monolith of claim 10, wherein the skewed corrugations define a skew angle which is not greater than an angle formed by the longitudinal axis of the strips, in a vicinity of the carrier, and the longitudinal axis of the carrier.

12. The monolith of claim 10, wherein the skewed corrugations define a skew angle which is approximately half an angle formed by the longitudinal axis of the strips, in a vicinity of the carrier, and the longitudinal axis of the carrier.

13. The monolith of claim 9, wherein the strips include alternating corrugated and flat strips, and wherein the corrugated strips have zero skew.

14. The monolith of claim 9, wherein there are a sufficient number of strips such that substantially all of a cross-section of the monolith, between the central region and the shell, is occupied by the strips.

15. The monolith of claim 9, wherein each strip is curved in a shape which is substantially an involute.

16. The monolith of claim 9, wherein the central region is bounded by a central member to which the strips are attached.

17. A monolith for imparting swirl to a gas stream, comprising:
   a) a plurality of strips defining channels for gas flow, each strip having a longitudinal axis,
   b) the strips being attached to a carrier along a line of intersection between the strip and the carrier, the carrier having a longitudinal axis, wherein the line of intersection is oblique to the longitudinal axis of the carrier,
   c) wherein the strips extend from the carrier to a central region, and
   d) the carrier being curved to form a shell which encloses the strips and the central region.

18. The monolith of claim 17, wherein the strips include alternating corrugated and flat strips, and wherein the corrugated strips include skewed corrugations.

19. The monolith of claim 18, wherein the skewed corrugations define a skew angle which is not greater than an angle formed by the longitudinal axis of the strips, in a vicinity of the carrier, and the longitudinal axis of the carrier.

20. The monolith of claim 18, wherein the skewed corrugations define a skew angle which is approximately half an angle formed by the longitudinal axis of the strips, in a vicinity of the carrier, and the longitudinal axis of the carrier.

21. The monolith of claim 17, wherein the strips include alternating corrugated and flat strips, and wherein the corrugated strips have zero skew.

22. The monolith of claim 17, wherein there are a sufficient number of strips such that substantially all of a cross-section of the monolith, between the central region and the shell, is occupied by the strips.

23. The monolith of claim 17, wherein each strip is curved in a shape which is substantially an involute.

24. The monolith of claim 17, wherein the central region is bounded by a central member to which the strips are attached.

* * * * *